US012794083B2

(12) United States Patent
Kwon et al.

(10) Patent No.: US 12,794,083 B2
(45) Date of Patent: Nov. 10, 2026

(54) SECONDARY BATTERY AND METHOD FOR MANUFACTURING THE SAME

(71) Applicant: LG ENERGY SOLUTION, LTD., Seoul (KR)

(72) Inventors: Soon Kwan Kwon, Daejeon (KR); Su Taek Jung, Daejeon (KR); Seok Hoon Jang, Daejeon (KR); Hyeok Jeong, Daejeon (KR); Sang Ho Bae, Daejeon (KR); Byeong Kyu Lee, Daejeon (KR); Seong Won Choi, Daejeon (KR); Min Wook Kim, Daejeon (KR); Yong Jun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 429 days.

(21) Appl. No.: 18/276,538

(22) PCT Filed: Apr. 19, 2022

(86) PCT No.: PCT/KR2022/005614
§ 371 (c)(1),
(2) Date: Aug. 9, 2023

(87) PCT Pub. No.: WO2022/231198
PCT Pub. Date: Nov. 3, 2022

(65) Prior Publication Data

US 2024/0120616 A1 Apr. 11, 2024

(30) Foreign Application Priority Data

Apr. 28, 2021 (KR) ........................ 10-2021-0055218
Apr. 15, 2022 (KR) ........................ 10-2022-0047202

(51) Int. Cl.
*H01M 50/46* (2021.01)
*H01M 10/04* (2006.01)
(Continued)

(52) U.S. Cl.
CPC ....... *H01M 50/46* (2021.01); *H01M 10/0422* (2013.01); *H01M 10/049* (2013.01);
(Continued)

(58) Field of Classification Search
CPC ..... H01M 4/00–98; H01M 10/00–667; H01M 50/00–77
(Continued)

(56) References Cited

U.S. PATENT DOCUMENTS 10,411,243 B2 9/2019 Tsuji et al.
2004/0043289 A1 * 3/2004 Shimamura ......... H01M 50/557 429/153
(Continued)

FOREIGN PATENT DOCUMENTS

CN 1713417 A 12/2005
CN 1770544 A 5/2006
(Continued)

OTHER PUBLICATIONS

International Search Report (PCT/ISA/210) issued in PCT/KR2022/005614, dated Jul. 27, 2022.
(Continued)

*Primary Examiner* — Bach T Dinh
(74) *Attorney, Agent, or Firm* — Birch, Stewart, Kolasch & Birch, LLP

(57) ABSTRACT

A secondary battery includes an electrode assembly having a positive electrode provided with a positive electrode tab, a separator, and a negative electrode provided with a negative electrode tab, the positive electrode, the separator, and the negative electrode being wound, the electrode assembly having a core part at a center thereof; a can configured to receive the electrode assembly therein, the negative electrode tab being connected to the can; a cap assembly coupled to an opening of the can, the positive electrode tab being
(Continued)

connected to the cap assembly; and a reinforcing member provided on an end of the separator exposed beyond the positive electrode or the negative electrode to prevent heat of the positive electrode tab or the negative electrode tab from being transferred to the separator.

16 Claims, 9 Drawing Sheets

(51) Int. Cl.
*H01M 10/658* (2014.01)
*H01M 50/107* (2021.01)
*H01M 50/403* (2021.01)
*H01M 50/531* (2021.01)

(52) U.S. Cl.
CPC ....... *H01M 10/658* (2015.04); *H01M 50/107* (2021.01); *H01M 50/403* (2021.01); *H01M 50/531* (2021.01)

(58) Field of Classification Search
USPC .......................................... 429/1–11, 65–255
See application file for complete search history.

(56) References Cited

U.S. PATENT DOCUMENTS

| | | | | |
|---|---|---|---|---|
| 2005/0277018 | A1 | 12/2005 | Kim | |
| 2006/0051662 | A1 | 3/2006 | Kwak et al. | |
| 2006/0093903 | A1 | 5/2006 | Hong et al. | |
| 2006/0093922 | A1* | 5/2006 | Kim .................... | H01M 50/202 429/251 |
| 2007/0172726 | A1* | 7/2007 | Miller ................. | H01M 50/469 429/246 |
| 2009/0029253 | A1* | 1/2009 | Itou ................... | H01M 10/0525 429/223 |
| 2009/0246639 | A1 | 10/2009 | Kim | |
| 2010/0086858 | A1 | 4/2010 | Kim | |
| 2012/0279056 | A1 | 11/2012 | McKinney et al. | |
| 2016/0043374 | A1 | 2/2016 | Seong | |
| 2020/0106060 | A1 | 4/2020 | Shin et al. | |
| 2021/0021004 | A1 | 1/2021 | Kim et al. | |
| 2021/0050837 | A1 | 2/2021 | Kim et al. | |
| 2022/0200100 | A1 | 6/2022 | Wang et al. | |
| 2022/0255081 | A1* | 8/2022 | Shibutani .......... | H01M 10/0431 |
| 2023/0246223 | A1 | 8/2023 | Wu et al. | |

FOREIGN PATENT DOCUMENTS

| | | | |
|---|---|---|---|
| CN | 112310574 | A | 2/2021 |
| CN | 112582753 | A | 3/2021 |
| JP | 5-109435 | A | 4/1993 |
| JP | 11-25937 | A | 1/1999 |
| JP | 3230279 | B2 | 11/2001 |
| JP | 2010-10117 | A | 1/2010 |
| JP | 5113434 | B2 | 1/2013 |
| KR | 10-2005-0112421 | A | 11/2005 |
| KR | 10-2005-0123366 | A | 12/2005 |
| KR | 10-0659881 | B1 | 12/2006 |
| KR | 10-2007-0078853 | A | 8/2007 |
| KR | 10-2007-0108761 | A | 11/2007 |
| KR | 10-2012-0062254 | A | 6/2012 |
| KR | 10-1709527 | B1 | 2/2017 |
| KR | 10-2019-0049206 | A | 5/2019 |
| KR | 10-2020-0065947 | A | 6/2020 |
| KR | 10-2020-0065950 | A | 6/2020 |
| KR | 10-2020-0070895 | A | 6/2020 |
| KR | 10-2021-0023527 | A | 3/2021 |
| WO | 2018/123088 | A1 | 7/2018 |

OTHER PUBLICATIONS

Extended European Search Report for European Application No. 22796031.7, dated May 20, 2025.

* cited by examiner

SECONDARY BATTERY AND METHOD FOR MANUFACTURING THE SAME

CROSS-REFERENCE TO RELATED APPLICATION

The present application claims the benefit of the priority of Korean Patent Application Nos. 10-2021-0055218, filed on Apr. 28, 2021, 10-2022-0047202, filed on Apr. 15, 2022, which are hereby incorporated by reference in their entirety.

TECHNICAL FIELD

The present invention relates to a secondary battery and a method for manufacturing the same, and more particularly, to a secondary battery capable of preventing heat of a positive electrode tab or a negative electrode tab from being transferred to a separator, and a method for manufacturing the same.

BACKGROUND ART

In general, secondary batteries refer to chargeable and dischargeable batteries, unlike primary batteries that is impossible to charge. Such secondary batteries are widely used in high-tech electronic devices such as phones, notebook computers, and camcorders.

The secondary batteries are classified into a can type secondary battery, in which an electrode assembly is embedded in a metal can, and a pouch type secondary battery in which an electrode assembly is embedded in a pouch. A can type secondary battery comprises an electrode assembly, an electrolyte, a can accommodating the electrode assembly and the electrolyte, and a cap assembly mounted in an opening of the can. In addition, the pouch type secondary battery comprises an electrode assembly, an electrolyte, and a pouch accommodating the electrode assembly and the electrolyte.

The electrode assembly of the can type secondary battery has a structure in which electrodes and separators are alternately stacked and wound in the form of a jelly-roll. In addition, the electrode comprises a positive electrode and a negative electrode, and the positive electrode comprises a positive electrode tab, and the negative electrode comprises a negative electrode tab. In addition, the positive electrode tab is connected to the cap assembly, and the negative electrode tab is connected to the can.

However, in a can type secondary battery having the above structure, high-temperature heat is generated in the positive electrode tab and the negative electrode tab when external short circuit occurs, and as the high-temperature heat of the positive electrode tab and the negative electrode tab is transferred to the separator, the separator is contracted, and as a result, the positive electrode and the negative electrode respond to each other to cause a problem in that the short circuit or ignition occurs.

In particular, since the separator rather than a periphery portion is tightly wound in a core part of the electrode assembly close to the positive electrode tab, the separator is severely contracted, and as a result, there is a problem in that possibility of the short circuit or ignition is high.

DISCLOSURE OF THE INVENTION

Technical Problem

An object of the present invention is to provide a secondary battery capable of preventing heat of a positive electrode tab or a negative electrode tab from being transferred to a separator even when high-temperature heat is generated in the positive electrode tab and the negative electrode tab to prevent the separator from being contracted, thereby preventing short circuit or ignition from occurring, and a method for manufacturing the same.

Technical Solution

A secondary battery of the present invention may comprise: an electrode assembly having a positive electrode provided with a positive electrode tab, a separator, and a negative electrode provided with a negative electrode tab, the positive electrode, the separator, and the negative electrode being wound, the electrode assembly having a core part at a center thereof; a can configured to accommodate electrode assembly therein, the negative electrode tab being connected to the can; a cap assembly coupled to an opening of the can, the positive electrode tab being connected to the cap assembly; and a reinforcing member provided on an end of the separator exposed beyond the positive electrode or the negative electrode to prevent heat of the positive electrode tab or the negative electrode tab from being transferred to the separator.

The reinforcing member may comprise a first reinforcing layer provided on only one surface of the separator disposed in the core part.

The reinforcing member may further comprise a second reinforcing layer provided on only a portion of the end of the separator disposed within a set range with respect to the positive electrode tab or the negative electrode tab.

The reinforcing member may be made of a material having an electrical insulating property and a thermal insulating property.

The secondary battery may further comprise a protection layer on an outside of the reinforcing member to protect the reinforcing member.

The protection layer may surround an entirety of the reinforcing member not in contact with the separator.

The second reinforcing layers may be provided on opposite surfaces of the separator so as not to be in contact with each other, thereby preventing heat from being transferred.

A method for manufacturing a secondary battery of the present invention may comprises: of manufacturing an electrode assembly having a positive electrode provided with a positive electrode tab, a separator, and a negative electrode provided with a negative electrode tab, the positive electrode, the separator, and the negative electrode being wound, the electrode assembly having a core part at a center thereof; inserting the electrode assembly into the can and connecting the negative electrode tab provided in the electrode assembly to the can; applying a reinforcing member on an end of the separator exposed beyond the positive electrode or the negative electrode to prevent heat of the positive electrode tab or the negative electrode from being transferred to the separator; and connecting the positive electrode tab of the electrode assembly to a cap assembly and coupling the cap assembly to an opening of the can to manufacture the secondary battery.

The reinforcing member may comprise a first reinforcing layer applied on only one surface of the separator disposed in the core part.

The reinforcing member may further comprise a second reinforcing layer applied on only a portion of the end of the separator disposed within a set range with respect to the positive electrode tab or the negative electrode tab.

The reinforcing member may be made of a material having an electrical insulating property and thermal insulating property.

The applying the reinforcing member may further comprise applying a protection layer to an outside of the reinforcing member to protect the reinforcing member.

The protection layer may surround an entirety of the reinforcing member not in contact with the separator.

The second reinforcing may be applied to opposite surfaces of the separator so as not to be in contact with each other, thereby preventing heat from being transferred.

The applying the reinforcing member may further comprise, before applying the second reinforcing layer, attaching a protection film to the positive electrode tab to prevent the second reinforcing layer from being applied to the positive electrode tab; and removing the protection film attached to the positive electrode tab when the applying of the second reinforcing layer is completed.

In the applying the reinforcing member, when the first reinforcing layer is applied, the first reinforcing layer may be applied in a state in which the can is erected vertically, and the can may be rotated in a left and right direction.

The set range may be a rotation radius of 2 mm to 10 mm with respect to the positive electrode tab or the negative electrode tab.

Advantageous Effects

The secondary battery of the present invention may comprise the reinforcing member for preventing the heat of the positive electrode tab or the negative electrode tab from being transferred to the separator to prevent the separator disposed in the core part of the electrode assembly and the separator adjacent to the positive electrode tab or the negative electrode tab from being contracted, thereby improving the safety.

MODE FOR CARRYING OUT THE INVENTION

Figure 1:
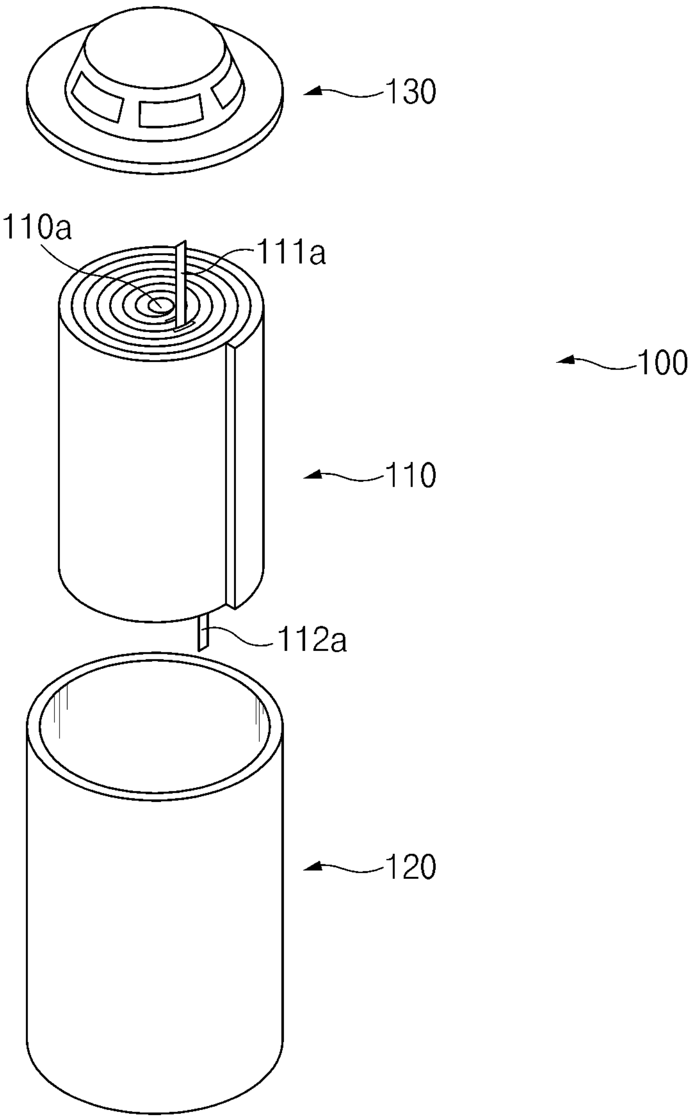
FIG. 1 is a perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery According to First Embodiment of the Present Invention

As illustrated in FIGS. 1 to 6, a secondary battery 100 according to a first embodiment of the present invention comprises an electrode assembly 110, a can 120 accommodating the electrode assembly 110, and a cap assembly 130 mounted in an opening of the can 120.

Electrode Assembly

The electrode assembly 110 has a structure in which a laminated sheet in which a positive electrode 111 and a negative electrode 112 are laminated with a separator 113 interposed therebetween is wound in the form of a jelly-roll. Here, the positive electrode 111 is provided with a positive electrode tab 111*a* coupled to the cap assembly 130, and the negative electrode 112 is provided with a negative electrode tab 112*a* coupled to the can 120.

A core part 110*a* that is penetrated vertically when viewed in FIG. 1 is formed at a center of the electrode assembly that is wound in the form of the jelly-roll.

Can

The can 120 has a cylindrical shape and comprises an accommodation part accommodating the electrode assembly 110, a coupling part provided at an upper side of the accommodation part and coupled to the cap assembly, and a beading part provided between the accommodation part and the coupling part to support the cap assembly. Here, the negative electrode tab 112*a* of the electrode assembly 110 is coupled to a bottom surface of the can.

Cap Assembly

The cap assembly 130 is configured to seal the opening of the can and has a structure in which a vent, a current breaker, a PTC, and a top cap are sequentially disposed from a lower side. Here, the positive electrode tab 111*a* of the electrode assembly 110 is coupled to a bottom surface of the vent.

In the secondary battery, when external short circuit occurs, heat is generated from the positive electrode tab and the negative electrode tap, and the separator is contracted while the heat of the positive electrode tab and the negative electrode tab is transferred to the separator, and as a result, there is a problem in that the short circuit and ignition occurs. In particular, since the separator disposed in the core of the electrode assembly is tightly wound, there is a problem in that the positive electrode tab and the negative electrode tab are greatly contracted due to the generated heat.

The secondary battery 100 according to the first embodiment of the present invention may comprise a reinforcing member provided on an end of the separator 113 exposed to the outside from the positive electrode or the negative electrode and configured to prevent the heat of the positive electrode tab 111*a* or the negative electrode tab 112*a* from being transferred to the separator 113. As a result, it is possible to prevent the contraction of the separator, thereby preventing the short circuit or ignition from occurring.

That is, the reinforcing member may reinforce strength of the separator 113 close to the positive electrode tab 111*a* and the negative electrode tab 112*a* and the separator 113 disposed in the core part 110*a* of the electrode assembly 110 and prevent the heat from being transferred, thereby preventing the separator 113 from being contracted and also preventing the short circuit and the ignition from occurring.

For example, the reinforcing member comprises a first reinforcing layer 140 and a second reinforcing layer 150 as illustrated in FIGS. 3 to 6.

The first reinforcing layer 140 is provided while being applied on a surface of the separator 113 disposed in the core part 110*a* of the electrode assembly 110. That is, the first reinforcing layer 140 reinforces the strength of the separator 113 and blocks the heat transfer to prevent the separator from being contracted.

Figure 2:
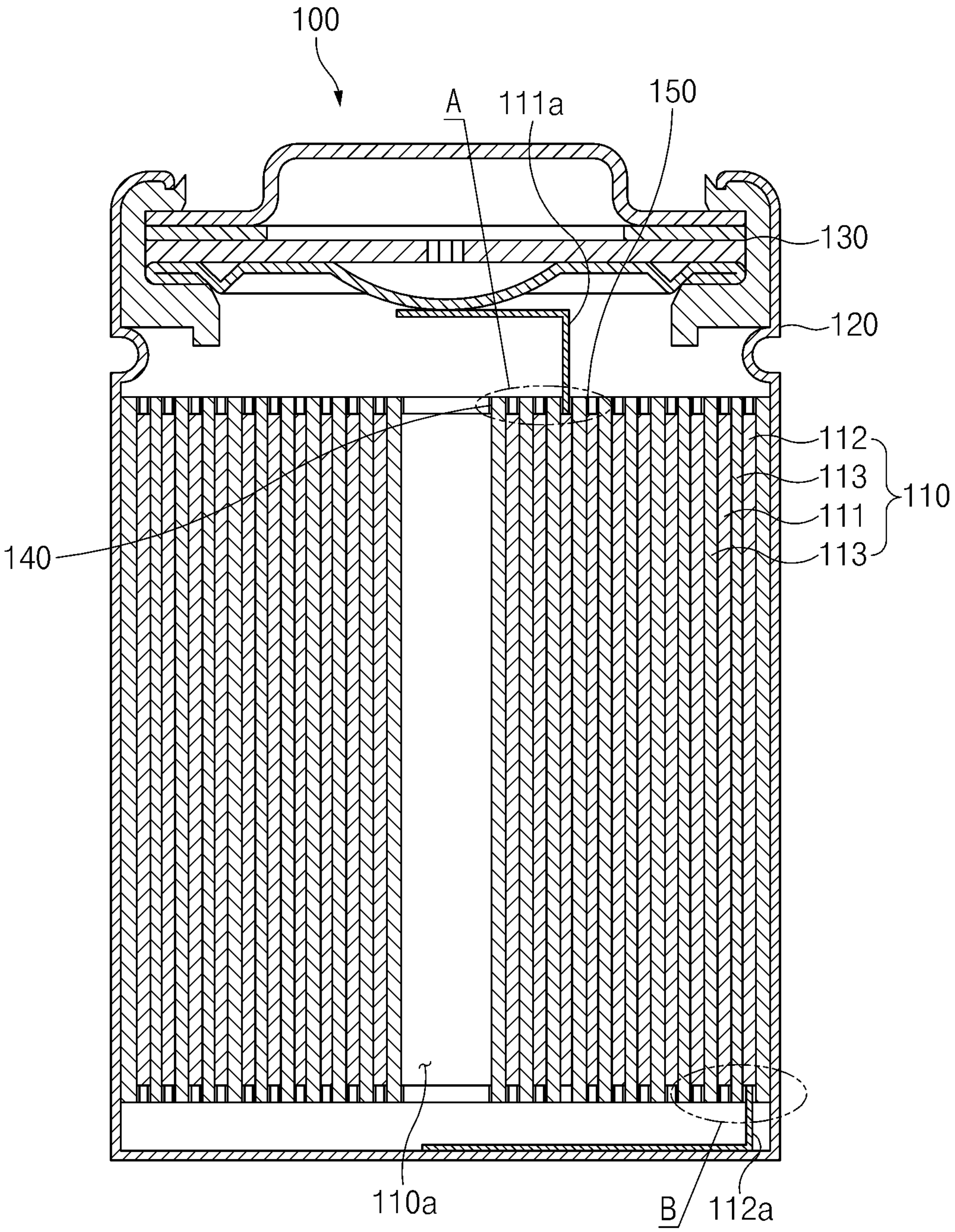
FIG. 2 is a cross-sectional view of the secondary battery according to the first embodiment of the present invention.
Figure 3:
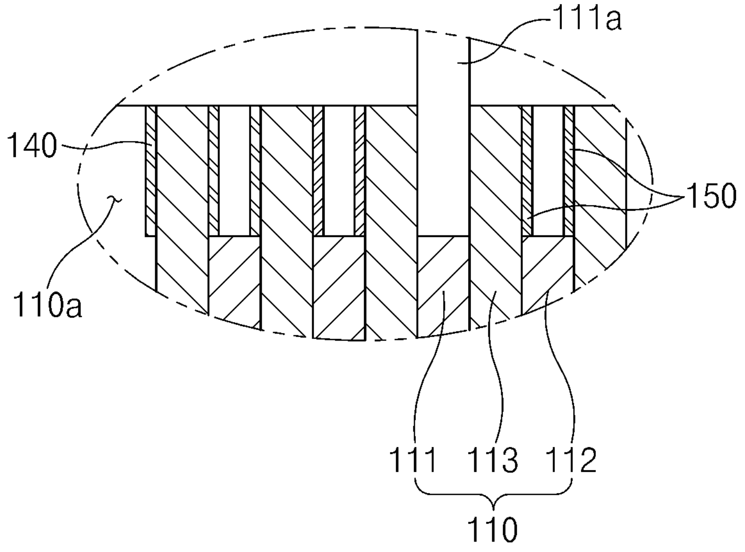
FIG. 3 is an enlarged view of a portion 'A' illustrated in FIG. 2.
Figure 4:
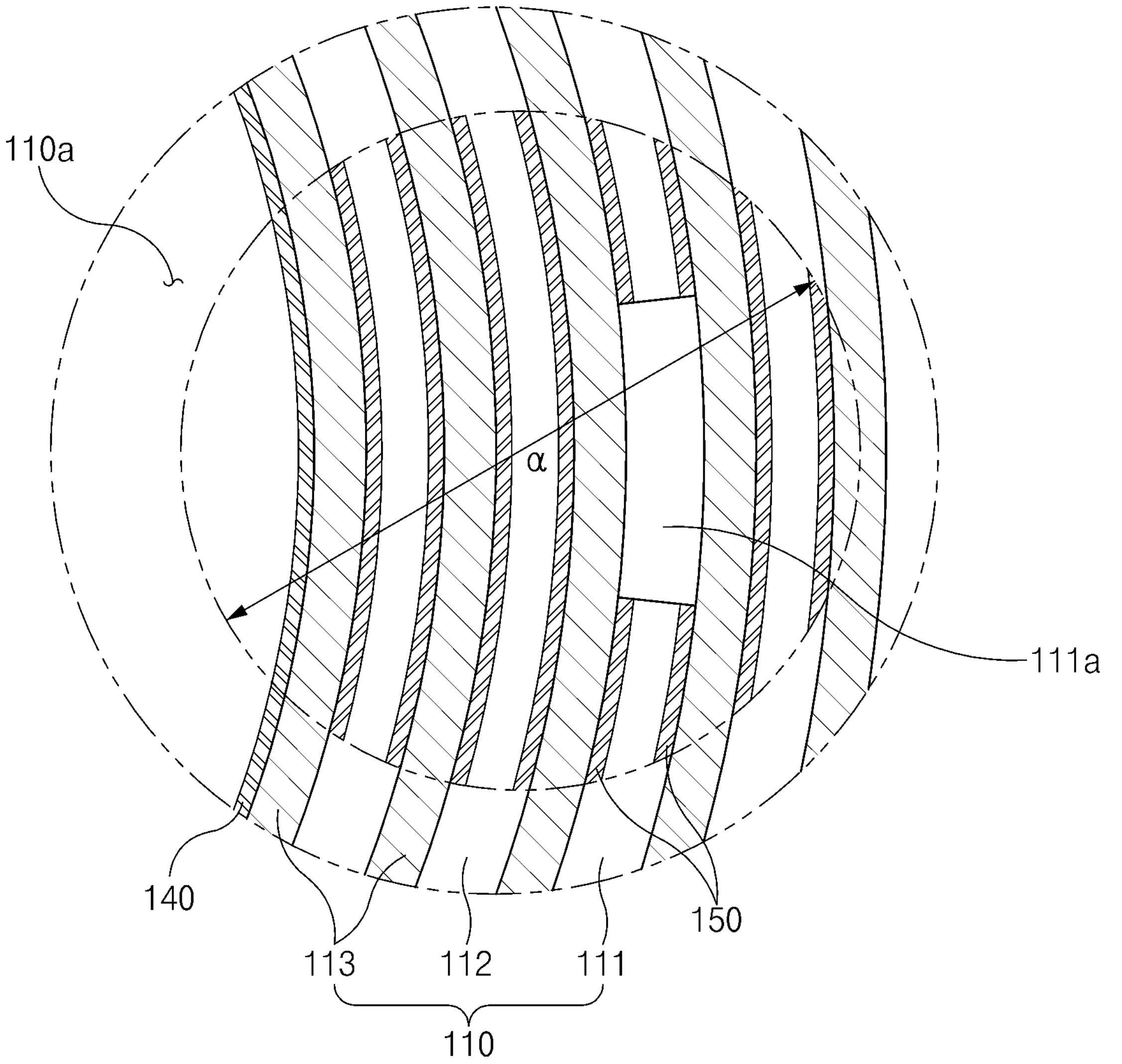
FIG. 4 is a plan view illustrating a portion of an electrode assembly, in which a positive electrode tab of the secondary battery is disposed, according to the first embodiment of the present invention.

In other words, referring to FIGS. 3 and 4, the first reinforcing layer 140 may be applied with the same thickness to an end (the uppermost end and lowermost end of the separator exposed from the positive electrode and the negative electrode when viewed in FIG. 2) of the separator 113, which is exposed from the positive electrode 111 and the negative electrode 112, and thus, the strength of the entire separator exposed to the outside of the positive electrode and the negative electrode may be reinforced, and the heat of the positive electrode tab and the negative electrode tab may be prevented from being transferred to the separator to significantly prevent the separator 113 from being contracted, thereby preventing the short circuit and ignition from occurring.

The first reinforcing layer 140 may be provided only on an end surface of the separator exposed to the outside of each of the positive electrode and the negative electrode. Thus, an increase in weight of the electrode assembly may be minimized, and use of the first reinforcing layer may be minimized. That is, the contraction of the separator may occur on the end surface of the separator exposed to the outside of each of the positive electrode and the negative electrode, and thus, the first reinforcing layer may be provided on only the end surface of the separator exposed to the outside of each of the positive electrode and the negative electrode to prevent the first reinforcing layer from being unnecessarily wasted.

The reinforcing member may comprise the second reinforcing layer 150 applied on the separator 113 disposed within a set range based on the positive electrode tab 111*a* and the negative electrode tab 112*a* of the electrode assembly 110.

In particular, the second reinforcing layer 150 may be provided only on the end of the separator disposed within the set range with respect to the positive electrode tab or the negative electrode tab.

That is, as illustrated in FIG. 4, the second reinforcing layer 150 may be provided at the end of the separator 113 disposed within a set range α with respect to the positive electrode tab 111*a*, and thus, the heat of the positive electrode tab may be prevented from being transferred to the separator to prevent the separator 113 from being contracted. In summary, it is possible to prevent the separator from being contracted due to the generated heat of the positive electrode tab during the external short circuit.

In particular, since the second reinforcing layer 150 is provided on only the end of the separator disposed within the set range α with respect to the positive electrode tab, the second reinforcing layer may be prevented from being the unnecessarily wasted, and as a result, manufacturing costs may be greatly reduced. Since the contraction occurs up to the separator disposed within the set range a with respect to the positive electrode tab when the heat is generated from the positive electrode tab, it is unnecessary to apply the second reinforcing layer up to the separator out of the set range.

Here, the set range α may be a rotation radius of 2 mm to 10 mm based on the positive electrode tab. That is, the high-temperature heat of the positive electrode tab may be diffused from the rotation radius of 2 mm to the rotation radius of 10 mm, and thus, it is unnecessary to provide the second reinforcing layer on the end of the separator disposed at the rotation radius of 2 mm to 10 mm based on the positive electrode tab. The set range may be set eccentrically with respect to the positive electrode tab according to the diffused range of the high-temperature heat generated in the positive electrode tab.

Figure 5:
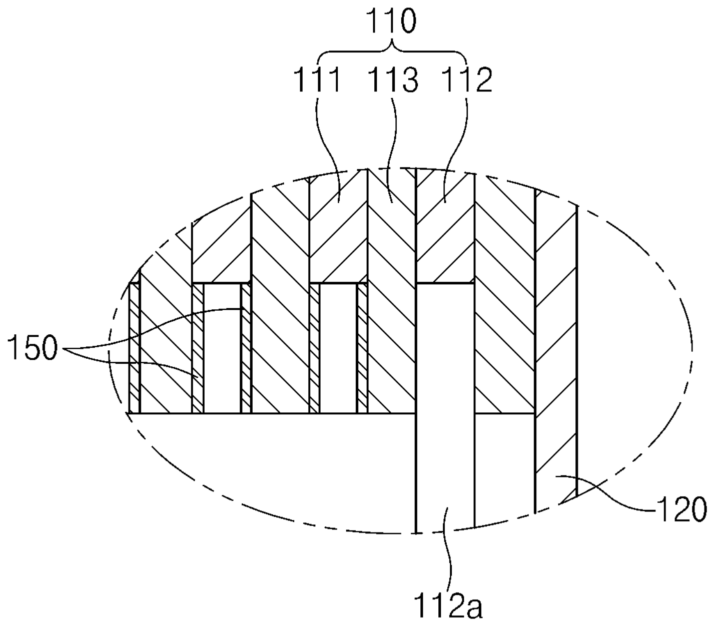
FIG. 5 is an enlarged view of a portion 'B' illustrated in FIG. 2.
Figure 6:
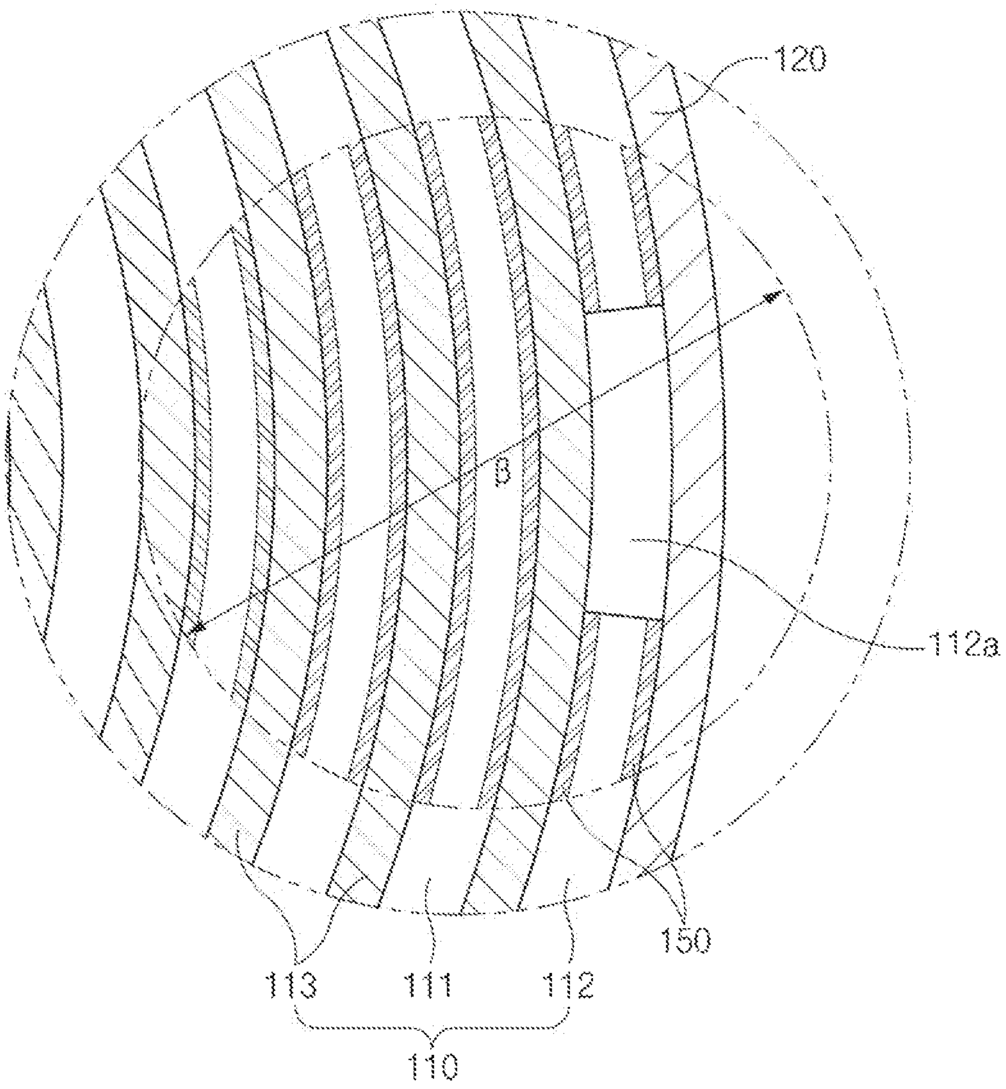
FIG. 6 is a bottom view illustrating a portion of the electrode assembly, in which a negative electrode tab of the secondary battery is disposed, according to the first embodiment of the present invention.

In addition, as illustrated in FIGS. 5 and 6, the second reinforcing layer 150 may be provided on the end of the separator 113 disposed within a set range β with respect to the negative electrode tab 112*a*. Thus, it is possible to prevent the heat of the negative electrode tab from being transferred to the separator, and as a result, it is possible to prevent the separator 113 from being contracted. That is, it is possible to prevent the contraction of the separator due to the heat generated by the negative electrode tab during the external short circuit.

In particular, since the second reinforcing layer 150 is provided on only the end of the separator disposed within the set range β with respect to the negative electrode tab, the second reinforcing layer may be prevented from being the unnecessarily wasted, and as a result, manufacturing costs may be greatly reduced.

Here, the set range β may be a rotation radius of 2 mm to 10 mm based on the negative electrode tab. That is, the high-temperature heat of the negative electrode tab may be diffused from the rotation radius of 2 mm to the rotation radius of 10 mm, and thus, it is unnecessary to provide the second reinforcing layer on the end of the separator disposed at the rotation radius of 2 mm to 10 mm based on the negative electrode tab.

The second reinforcing layers 150 respectively applied on the corresponding separators 113 may be provided so as not to be in contact with each other, thereby preventing the heat transfer. That is, a space may be formed between the second reinforcing layers 150 that are respectively applied on the corresponding separators 113.

The reinforcing member may be made of a material having thermal insulating properties and electrical insulating properties. Thus, it is possible to prevent the heat of the positive electrode tab and the negative electrode tab from being transferred to the separator. For example, the reinforcing member may be made of ethylene propylene or epoxy.

Therefore, since the secondary battery 100 according to the first embodiment of the present invention may comprise the reinforcing member to prevent the heat of the positive electrode tab and the negative electrode tab from being transferred to the separator, and thus, prevent the separator from being contracted due to the high-temperature heat of the positive electrode tab and the negative electrode tab, thereby preventing the short circuit and ignition from occur and improving the safety.

Hereinafter, a method for manufacturing the secondary battery according to the first embodiment of the present invention will be described.

Figure 7:
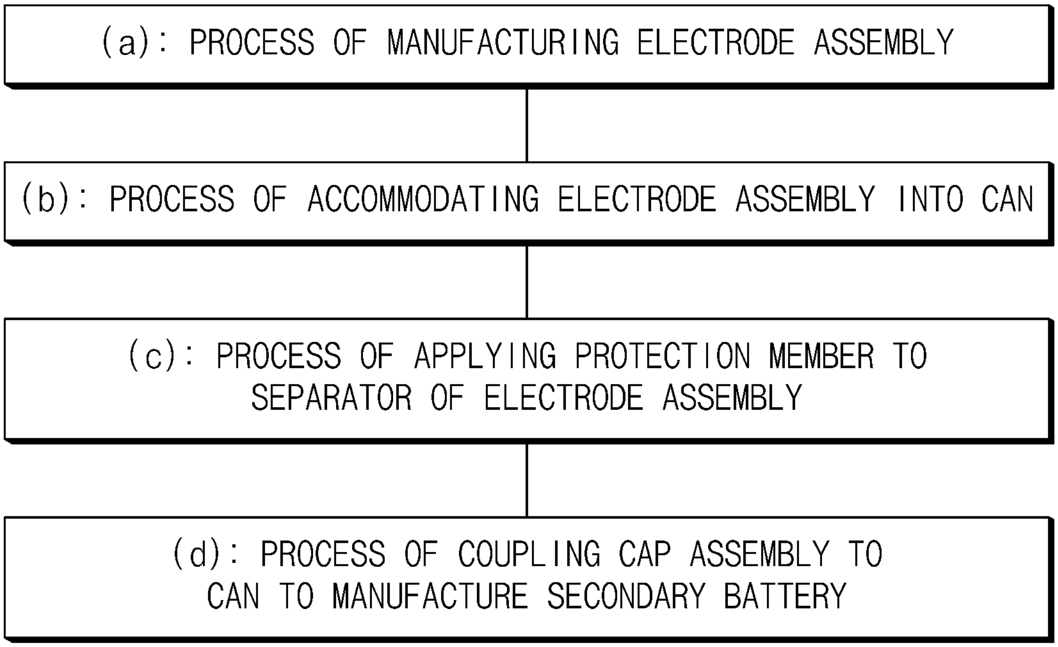
FIG. 7 is a flowchart illustrating a method for manufacturing the secondary battery according to the first embodiment of the present invention.

Method for Manufacturing Secondary Battery According to First Embodiment of the Present Invention As illustrated in FIG. 7, a method for manufacturing the secondary battery according to the first embodiment of the present invention comprises a process (a) of manufacturing an electrode assembly, a process (b) of accommodating the electrode assembly in a can, a process (c) of applying a reinforcing member, a process (d) of manufacturing a secondary battery.

In the process (a), a laminated sheet, in which a positive electrode 111 provided with a positive electrode tab 111*a*, a separator 113, and a negative electrode 112 provided with a negative electrode tab 112*a* are laminated, is wound in the form of a jelly-roll to manufacture an electrode assembly 110. Here, referring to FIG. 1, since the electrode assembly 110 is wound in the form of the jelly-roll, a core part 110*a* penetrated vertically is formed in a center of the electrode assembly.

In the process (b), the electrode assembly 110 is inserted into the can 120, and then the negative electrode tab 112*a* provided in the electrode assembly 110 is coupled to a bottom surface of the can 120.

In the process (c), a reinforcing member is applied on an end of the separator 113 exposed to the outside from the positive electrode 111 or the negative electrode 112 to prevent heat of the positive electrode 111 or the negative electrode 112 from being transferred to the separator 113.

That is, the process (c) comprises a process of applying a first reinforcing layer, and in the process of applying the first reinforcing layer, the first reinforcing layer 140 is applied to only one surface of the separator 113 disposed in the core part 110*a* of the electrode assembly 110. Thus, while the heat of the positive electrode tab is blocked by the first reinforcing layer to prevent the separator disposed in the core part from being contracted. Here, the first reinforcing layer 140 is formed by applying a first protective liquid to a surface of the separator 113 and then drying the first protective liquid.

In particular, in the process (c), when the first reinforcing layer 140 is applied, the first reinforcing layer is applied on one surface of the separator disposed in the core part 110*a* in a state in which the can 120 is vertically erected, and then, the can 120 rotates to a left and right side. Therefore, workability may be improved.

The process (c) further comprises a process of applying a second reinforcing layer. In the process of applying the second reinforcing layer, the second reinforcing layer 150 is applied on only an end of the separator disposed in a set range with respect to the positive electrode tab 111*a* or the negative electrode tab 112*a*.

For example, as shown in FIG. 4, the second reinforcing layer 150 may be provided at the end of the separator 113 disposed within a set range a with respect to the positive electrode tab 111*a*, and thus, the heat of the positive electrode tab may be prevented from being transferred to the separator.

Here, the set range $\alpha$ may be a rotation radius of 2 mm to 10 mm based on the positive electrode tab.

In addition, as illustrated in FIG. 6, the second reinforcing layer 150 may be provided on the end of the separator 113 disposed within a set range $\beta$ with respect to the negative electrode tab 112*a*. Thus, it is possible to prevent the heat of the negative electrode tab from being transferred to the separator.

The set range $\beta$ may be a rotation radius of 2 mm to 10 mm based on the negative electrode tab.

The reinforcing member may be made of a material having thermal insulating properties and electrical insulating properties. For example, the first reinforcing layer may be made of ethylene propylene or epoxy.

The second reinforcing layers 150 respectively applied on the separators 113 corresponding to each other in the process (c) may be provided in a non-contact structure. It is possible to prevent high-temperature heat from being transferred to the second reinforcing layers corresponding to each other.

The first reinforcing layer 140 and the second reinforcing layer 150 are made of the same material, and the second reinforcing layer 150 is applied to be thinner than the first reinforcing layer 140. Since the core part of the electrode assembly has low heat dissipation, the first reinforcing layer has a thick thickness, and since heat dissipation increases toward the periphery of the electrode assembly, the second reinforcing layer has a thin thickness In the process (d), the positive electrode tab 111*a* of the electrode assembly 110 is coupled to the cap assembly 130, and then, the cap assembly 130 is coupled to an opening of the can 120.

When the above processes are completed, a finished secondary battery 100 may be manufactured.

Hereinafter, in descriptions of another embodiment of the present invention, constituents having the same configuration and function as the above-mentioned embodiment have been given the same reference numeral in the drawings, and thus duplicated description will be omitted.

Secondary Battery According to Second Embodiment of the Present Invention

Figure 8:
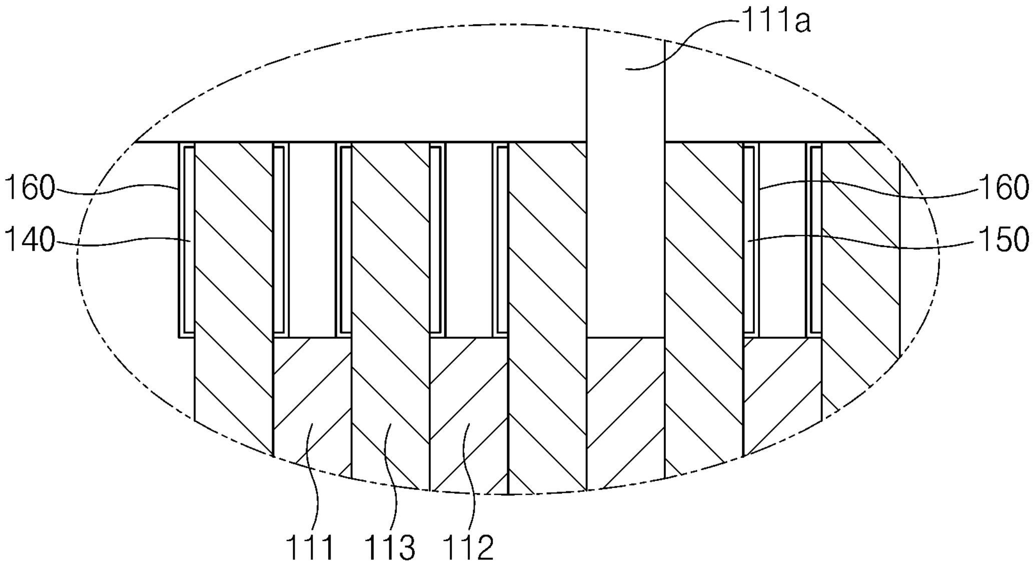
FIG. 8 is a cross-sectional view of a secondary battery according to a second embodiment of the present invention.

As illustrated in FIG. 8, a secondary battery according to a second embodiment of the present invention comprises an electrode assembly 110, a can 120 accommodating the electrode assembly 110, and a cap assembly 130 mounted in an opening of the can 120.

In addition, the secondary battery comprises a first reinforcing layer 140 applied on a core part of the electrode assembly 110 and a second reinforcing layer 150 applied on a separator adjacent to a positive electrode tab 111*a* and a negative electrode tab 112*a* of the electrode assembly 110.

Here, a protection layer 160 for protecting the first reinforcing layer 140 and the second reinforcing layer 150 may be applied on the outside of each of the first reinforcing layer 140 and the second reinforcing layer 150, and thus, the first reinforcing layer 140 and the second reinforcing layer 150 may be prevented from being damaged.

In particular, the protection layer 160 is applied to surround the entire first reinforcing layer 140 and second reinforcing layer 150, and thus, the entire first reinforcing layer 140 and second reinforcing layer 150 may be reliably protected.

The protection layer 160 may be made of an insulating material that is cheaper than the first reinforcing layer 140 and the second reinforcing layer 150 to reduce manufacturing costs.

Hereinafter, a method for manufacturing the secondary battery according to the second embodiment of the present invention will be described.

Figure 9:
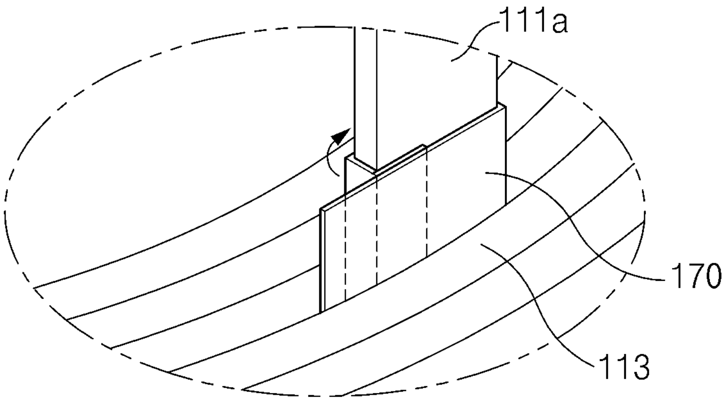
FIG. 9 is a perspective view illustrating a protection film of the secondary battery according to the second embodiment of the present invention.

Method for Manufacturing Secondary Battery According to Second Embodiment of the Present Invention As illustrated in FIGS. 8 and 9, a method for manufacturing the secondary battery according to the second embodiment of the present invention comprises a process (a) of manufacturing an electrode assembly, a process (b) of accommodating the electrode assembly in a can, a process (c) of applying a reinforcing member, a process (d) of coupling a cap assembly to the can to manufacture a secondary battery.

Here, the processes (a), (b), (c), and (d) have the same manufacturing method as that of the first embodiment described above, and thus duplicated descriptions will be omitted.

However, the secondary battery manufacturing method according to the second embodiment of the present invention further comprises a process of applying a protection layer.

That is, as illustrated in FIG. 8, in the process of applying the protection layer, the protection layer 160 is applied on the outside of the first reinforcing layer 140 and the second reinforcing layer 150. In particular, the protection layer 160 is applied to surround the entire first reinforcing layer 140 and second reinforcing layer 150. Thus, the first reinforcing layer and the second reinforcing layer may be protected.

Referring to FIG. 9, the process (c) may comprise a process of attaching a protection film before applying the second reinforcing layer 150. In the process of attaching the protection film, the protection film 170 is attached to the positive electrode tab 111*a* to prevent the second reinforcing layer 150 from being applied on the positive electrode tab.

The process (c) may further comprise a process of removing the protection film when the applying of the second reinforcing layer 150 is completed. In the process of removing the protection film, the protection film 170 attached to the positive electrode tab 111*a* may be removed to prevent the electrode assembly from being contaminated in advance.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Secondary battery
110: Electrode assembly
110*a*: Core part
111: Positive electrode
111*a*: Positive electrode tab
112: Negative electrode
112*a*: Negative electrode tab
113: Separator
120: Can
130: Cap assembly
140: First reinforcing layer
150: Second reinforcing layer
160: Protection layer
170: Protection film

The invention claimed is:

1. A secondary battery comprising:

an electrode assembly having a positive electrode provided with a positive electrode tab, a separator, and a negative electrode provided with a negative electrode tab, the positive electrode, the separator, and the negative electrode being wound into layers, the electrode assembly having a core part at a center thereof;

a can configured to accommodate the electrode assembly therein, the negative electrode tab being connected to the can;

a cap assembly coupled to an opening of the can; the positive electrode tab being connected to the cap assembly; and a reinforcing member provided on an end of the separator exposed beyond the positive electrode or the negative electrode to prevent heat of the positive electrode tab or the negative electrode tab from being transferred to the separator, wherein the reinforcing member comprises first reinforcing layers provided on the layers of the separator and extending only a partial distance in a circumferential direction, and wherein the positive electrode tab or the negative electrode tab is within an area of the electrode assembly having the first reinforcing layers.

2. The secondary battery of claim 1, wherein the reinforcing member further comprises a first-second reinforcing layer provided on only one layer of the separator disposed in the core part.

3. The secondary battery of claim 1, wherein the reinforcing member is made of a material having an electrical insulating property and a thermal insulating property.

4. The secondary battery of claim 1, wherein the first reinforcing layers are provided on opposite surfaces of the separator so as not to be in contact with each other, thereby preventing heat from being transferred.

5. A method for manufacturing a secondary battery, the method comprising:

manufacturing an electrode assembly having a positive electrode provided with a positive electrode tab, a separator, and a negative electrode provided with a negative electrode tab, the positive electrode, the separator, and the negative electrode being wound, the electrode assembly having a core part at a center thereof;

inserting the electrode assembly into a can and connecting the negative electrode tab provided in the electrode assembly to the can;

applying a reinforcing member on an end of the separator exposed beyond the positive electrode or the negative electrode to prevent heat of the positive electrode tab or the negative electrode from being transferred to the separator; and connecting the positive electrode tab of the electrode assembly to a cap assembly and coupling the cap assembly to an opening of the can to manufacture the secondary battery, wherein the reinforcing member comprises first reinforcing layers provided on the layers of the separator and extending only a partial distance in a circumferential direction, and wherein the positive electrode tab or the negative electrode tab is within an area of the electrode assembly having the first reinforcing layers.

6. The method of claim 5, wherein the reinforcing member further comprises a second reinforcing layer applied on only one surface of the separator disposed in the core part.

7. The method of claim 5, wherein the reinforcing member is made of a material having an electrical insulating property and a thermal insulating property.

8. A method for manufacturing a secondary battery, the method comprising:

manufacturing an electrode assembly having a positive electrode provided with a positive electrode tab, a separator, and a negative electrode provided with a negative electrode tab, the positive electrode, the separator, and the negative electrode being wound, the electrode assembly having a core part at a center thereof;

inserting the electrode assembly into a can and connecting the negative electrode tab provided in the electrode assembly to the can;

applying a reinforcing member on an end of the separator exposed beyond the positive electrode or the negative electrode to prevent heat of the positive electrode tab or the negative electrode from being transferred to the separator; and connecting the positive electrode tab of the electrode assembly to a cap assembly and coupling the cap assembly to an opening of the can to manufacture the secondary battery, wherein the applying the reinforcing member further comprises applying a protection layer to an outside of the reinforcing member to protect the reinforcing member.

9. The method of claim 8, wherein the protection layer surrounds an entirety of the reinforcing member not in contact with the separator.

10. The method of claim 8, wherein the reinforcing member is applied to opposite surfaces of the separator so as not to be in contact with each other, thereby preventing heat from being transferred.

11. The method of claim 6, wherein the applying the reinforcing member further comprises:

before applying the first reinforcing layers, attaching a protection film to the positive electrode tab to prevent the first reinforcing layers from being applied to the positive electrode tab; and removing the protection film attached to the positive electrode tab when the applying of the first reinforcing layers is completed.

12. The method of claim 6, wherein, in the applying the reinforcing member, when the second reinforcing layer is applied, the second reinforcing layer is applied in a state in which the can is erected vertically, and the can is rotated in a left and right direction.

13. The method of claim 6, wherein the area of the electrode assembly having the first reinforcing layers is a rotation radius of 2 mm to 10 mm with respect to the positive electrode tab or the negative electrode tab.

14. The secondary battery of claim 1, wherein the area of the electrode assembly having the first reinforcing layers is a rotation radius of 2 mm to 10mm with respect to the positive electrode tab or the negative electrode tab.

15. The secondary battery of claim 1, further comprising a protection layer on an outside of the reinforcing member to protect the reinforcing member.

16. The secondary battery of claim 15, wherein the protection layer surrounds an entirety of the reinforcing member not in contact with the separator.

* * * * *